United States Patent [19]

Walton et al.

[11] Patent Number: 4,894,196

[45] Date of Patent: Jan. 16, 1990

[54] METHOD AND APPARATUS FOR LONGITUDINAL COMPRESSIVE TREATMENT OF WEBS

[75] Inventors: Richard R. Walton, Boston, Mass.; George E. Munchbach, Roslindale, Mass.

[73] Assignee: Richard R. Walton, Boston, Mass.

[21] Appl. No.: 246,917

[22] Filed: Sep. 19, 1988

Related U.S. Application Data

[63] Continuation of Ser. No. 803,059, filed as PCT US85/00541 on Mar. 29, 1985, published as WO85/04369 on Oct. 10, 1985, abandoned, which is a continuation-in-part of Ser. No. 594,670, Mar. 29, 1984, abandoned.

[51] Int. Cl.[4] ........................ B29C 53/28; D06C 21/00

[52] U.S. Cl. .................................... 264/282; 26/18.6; 162/111; 162/280

[58] Field of Search ......................... 264/282; 26/18.6; 162/111, 280, 281, 282

[56] References Cited

U.S. PATENT DOCUMENTS 4,422,892 12/1983 Plant .................................. 264/282

FOREIGN PATENT DOCUMENTS 260721 9/1963 Australia ............................ 28/18.6

*Primary Examiner*—James Lowe

*Attorney, Agent, or Firm*—Fish & Richardson

[57] ABSTRACT

A machine and method for treating a web by longitudinal compressive action, by pressing a web against a driven roll to drive it into a treatment cavity bounded by the roll and an overlying surface, followed by application of retarding forces by extrusion in which the extrusion orifice is arranged with its axis substantially parallel to the roll at the web-drive point, and in which resilient self-adjustment of the extrusion orifice is achieved by employing a plate-form member parallel to the web which is resiliently urged toward the drive nip in the direction of extent of the plate-form member.

12 Claims, 6 Drawing Sheets

FIG Ib
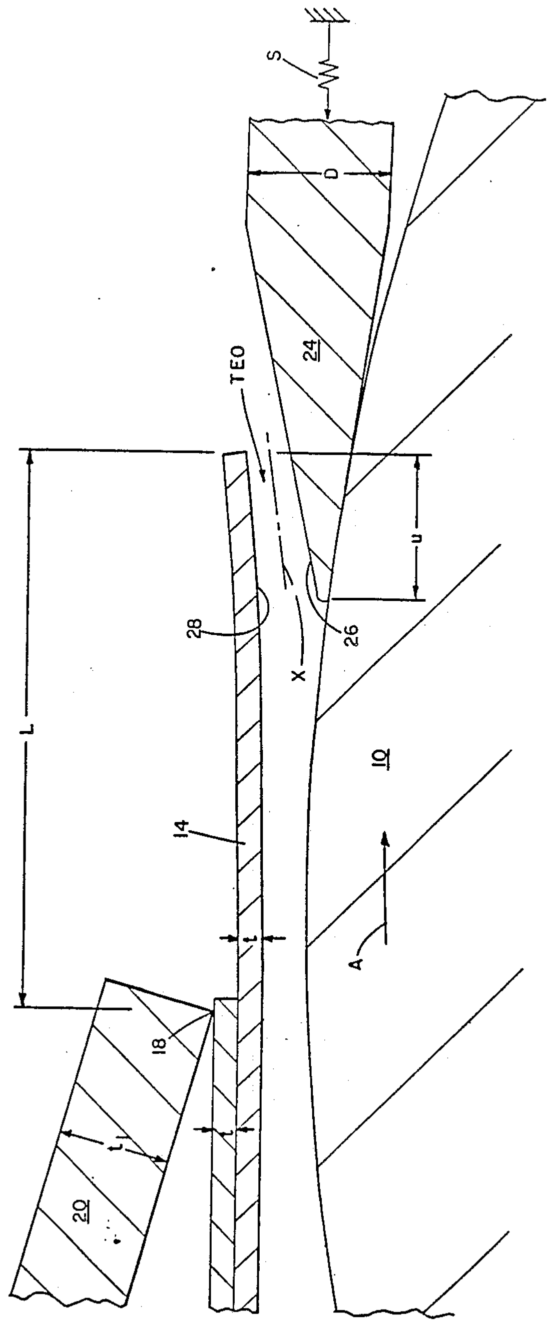

METHOD AND APPARATUS FOR LONGITUDINAL COMPRESSIVE TREATMENT OF WEBS

This application is a continuation of U.S. Ser. No. 803,059, filed as PCT US85/00541 on Mar. 29, 1985, published as W085/04369 on Oct. 10, 1985, which is a continuation-in-part of U.S. Ser. No. 594,670, filed Mar. 29, 1984, both, now abandoned.

BACKGROUND OF THE INVENTION

This invention relates to the longitudinal compressional treatment of flexible web materials such as knitted and woven textile fabrics, papers, plastic films, and so-called "non-wovens", the latter being of natural or synthetic substance formed into webs, e.g., as by air laying or wet laying of fibers.

In the laboratory from which the present invention comes, we have devoted many years to development of the treatment of webs in which longitudinal compressional forces are applied in the plane of the flexible web material. From this work has come a number of inventions, including the compactor, U.S. Pat. Nos. 2,765.5,13 and 2,765,514; the bladed microcreper, U.S. Pat. Nos. 3,260,778 and 3,426,405; the bladeless microcreper, U S. Pat. Nos. 3,810,280, 3,869,768 and 3,975,806; and the two roll microcreper, U.S. Pat. No. 4,142,278. As implemented by most of these inventions, the untreated web is driven longitudinally by using a low friction surface to press the web against a rotating drive roll and then, within a short distance of the drive point, retarding forces are applied to the traveling web. The opposition between the driving and retarding forces, while the material remains confined face-wise, produces desirable physical change in the web material, for instance, increase in its bulk, thickness and elasticity.

In the case of textile and textile-like materials, the web can be compacted longitudinally within it own plane, without folding of the web upon itself or formation of crepe, but with crimping in situ of the tiny individual fibers ("microcreping" of the fibers) that make up the threads or yarns of the fabric.

In the case of solid thin sheets such as paper or plastic film, the longitudinal compressive treatment can form barely perceptible undulations oz crepes in the web as a whole ("microcreping" of the web), in which the overall appearance of the faces of the web is still one of smoothness, without superficial coarse crepe or folds being present. If, however, coarse crepe is desired, this can be achieved by suitable enlargement of the treatment cavity.

In many cases desirable qualities produced by the longitudinal treatment remain in the web after some or even all of the compression in length of the web is removed by stretching.

In specific examples, the treatment can increase the softness or drapability of a web, increase its covering effect and opacity, make the surface texture of the web more appealing, render the web shrinkproof, apply decorative effects to the web, or cause components of the web to be more intimately interengaged in a way that is useful. Paper webs can be made stretchy and have their burst resistance improved.

With respect to many materials, the machine and process that has shown most promise employs an angled retarder/flexible retarder arrangement, illustrated in U.S. Pat. No. 3,260,778, now expired. The web is pressed by a stationary surface (the "primary" surface)

against a drive roll to provide a drive region, a stationary surface downstream of the drive region set at a substantial angle to the surface of the roll (the "angled retarder" surface) diverts the oncoming web through a substantial angle from its travel on the roll, and extending downstream from the primary surface, a thin flexible conforming surface (the "flexible retarder" surface) provides face-wise containment to the web as the web moves through the angle from roll surface to the angle of the angled retarder. By use of such a single roll geometry, a very small treatment cavity can be established that enables treatment of very thin webs and application of high pressures over short distances.

This angled retarder/flexible retarder arrangement seeks to achieve a balance between conflicting requirements. The substantial angle of the angled retarder enables an effective longitudinal compressive force to be applied to the web. Meanwhile, the flexible retarder, as it maintains the needed face-wise containment of the web while the web changes its angle of travel, also flexes to prevent choking of the travel of the treated web and to relieve excess pressure to prevent the web from snagging under the leading tip of the angled retarder blade.

In commercial devices built according to U.S. Pat. No. 3,260,778 the angle of the angled retarder has been about 38 degrees to the tangent to the roll and the flexible retarder that flexes to conform to that( angle has been a thin sheet of Swedish blue steel (e.g. 0.002 to 0.006 inch or 0.05 to 0.15 mm thickness).

A later machine using this principal, and further seeking to prevent snagging of the web beneath the tip of the angled retarder blade, is shown in Packard U.S. Pat. No. 4,090,385. In that machine, the roll is provided with grooves and the leading edge of the angled retarder is provided with spaced-apart mating fingers which are inserted into the grooves below the general surface of the roll. With this arrangement, variation in the treatment across the width of the roll may occur because the drive conditions are different at the grooved and nongrooved regions of the roll.

Longitudinal compressive treatment of webs using angled retarder/flexible retarder arrangements have been successful in certain commercial applications, though often the treatment has been limited to slow speed or to only a limited range of starting materials and products, and considerable operator skill often has been required in order to deal with changing production conditions.

A large number of cases have remained, particularly in the field of thin webs, in which commercialization has not occurred because of difficulty in setting up the treatment or in accomodating change in production conditions during running.

To give examples of changeable production conditions that can affect the opposed drive and retarding forces of the longitudinal compressive treatment and contribute to difficulties of initial set up or continued operation, we mention: change in the web-gripping character of the drive roll, for instance due to Wear of the drive roll surface or presence of foreign substances; variations in pressure of the web against the drive roll, due to change in the untreated web thickness or in the forces that press the confining surface and web against the drive roll or due to wear or change in the geometry of the confining surfaces; variation in the supply tension applied to the untreated web as it enters the treatment; change in the stiffness or softness of the untreated web as may occur due to change in moisture content or temperature of the original untreated web: change in the depth of the retarding passage through which the web passes; change in other retarder qualities due, e.g., to dimensional or speed change: and change in susceptibility of the web to its being retarded, e.g., due to change in the frictional qualities of the web to be treated; and so forth.

In production it has also been necessary to maintain precise alignment of the angled retarder. Such alignment may be difficult to maintain, and in some applications the alteration in treatment cavity dimensions resulting from slight misalignment may yield an unacceptably uneven product. For this reason, a rugged and expensive mounting has been considered necessary for the angled retarder/flexible retarder arrangement but still problems can occur.

Furthermore, during use of the angled retarder/flexible retarder arrangement for production, it has been critical to properly choose and maintain the flexible retarder to have it conform and apply proper resilient pressure to the angled retarder. Too little pressure applied by the flexible retarder, as may occur by wrong choice of its thickness, or due to wear, will prevent obtaining a desirable fine microcrepe effect. But with little change in the flexible retarder, a point is soon reached when too much pressure causes snags or tears by forcing material under the leading edge of the angled retarder. Improper alignment may put uneven pressure on the web, With a resulting unevenly treated product. And perhaps most disadvantageously, bending of the flexible retarder (e.g., repeated flexing during adjustment or use, or severe bending due to improper adjustment) can permanently deform the flexible retarder to introduce a permanent "set", reduce its pressure and resiliency, and cause the treatment to skip or end altogether.

As production conditions change during use of the angled retarder/flexible retarder arrangement, the point of treatment of the material under the low friction primary surface tends to shift forward or backward, and to affect the quality of the treatment. This requires backward or forward adjustment of the primary surface.

The job of the person operating the machine has been to take all production conditions into account when establishing the initial running adjustments of the treatment and, during operation, to observe changes in the conditions as they occur and to attempt to counteract these changes by compensatory adjustments. In practice, more than one variable production condition can change at the same time, producing a complicated behavior that the operator of the machine must seek to accomodate.

For the microcreping applications that have been commercialized, uniformity of treatment is often a critical requirement, and failure to make appropriate timely adjustments may harm the product. By way of example only, in producing disposable medical products such as surgical drapes, a large number of microcreped fabric sheets may be stacked so that a number of pieces are cut at the same time. If the sheets are not uniform, and therefore will nor lie flat, the cut will be uneven, producing misshapen articles.

Similarly, kraft paper used as a separator between stacked sheets of steel must be uniform to keep the pile of steel sheets flat on a pallet.

In another case, the softening of wadding of original thickness of the order of 0.001 inch (0.025 mm) requires extremely high speeds of treatment to be practical, Which may generate excessive heat that cannot be tolerated by the angled retarder/flexible retarder arrangement or the web being treated.

One important object of the present invention is to provide new techniques for longitudinal compressional treatment of webs which have the advantages of a single roll, bladed configuration but which reduce or eliminate the various critical features of the treatment. Another object is to enable uniform, high quality treated web products to be obtained with a wide range of materials and thicknesses, and especially with very thin webs. Another object is to provide a technique that enables use of relatively heavy, long-wearing elements capable of extended operation even at high speed. Another object is to provide a machine of improved simplicity of construction. Other objects of the invention are to achieve increase in production and energy efficiencies, and novel specific treatments for web materials. One specific object of the invention is to provide an improved method of shrinkproofing webs, for instance heavy diagonal weave fabrics such as cotton denims.

SUMMARY OF THE INVENTION

The invention features a bladed single roll machine (and methods using the machine) for microcreping a running length of web by applying extrusion retarding forces in which (a) the machine is adapted to treat the web in response to retarding forces produced by tangential extrusion and (b) resilient self-adjustment of the extrusion orifice is achieved by employing, to define one of the web-contacting surfaces that forms the extrusion orifice, a plate-form blade member parallel to the roll which is resiliently urged toward the drive nip in the direction of extent of the plate member.

In preferred embodiments: the web-contacting surface defining the other side of the extrusion orifice is a cantilevered integral continuation of the primary pressing surface; this second web-contacting surface is preferably capable of restricted flexing under treatment conditions to a curved shape in the direction opposite to that of the roll surface, to a curvature having a radius of the order of magnitude of the radius of the roll; the first web-contacting surface is movable while remaining parallel to its original plane to gradually vary the geometry of the treatment cavity, i.e. bodily toward or away from the nip to change the cavity size and by slight pivoting in the plane to change slightly the alignment of the upstream edge of the surface with respect to the roll surface; the angle of the axis of the extrusion orifice relative to the tangent to the roll ar the final point of positive drive is less than 20° ; and the height of the treatment cavity gradually increases in the direction of web travel as a result of gradual, diverging curvature of both the roll and the overlying surface.

The above recited method and machine have various advantages described below in the section entitled operation.

Specifically, tangential extrusion as described below imparts a squeezing force to the web in a manner that avoids problems inherent in the geometry of the diversionary treatment processes. The geometry and forces of the tangential extrusion allow variation in position in its plane of the lower web-contacting member which, in effect, permits automatic adjustment of the treatment cavity geometry to reduce the risk of snagging or improper treatment forces or takes away from the criticality of the adjustment of this member.

The exact limit in the variation of the extrusion passage from true tangency depends upon the entire set of variables that apply and the result desired. An angle of 20° may be permitted in certain instances while still obtaining desirable results of the invention. In the case of using a 0.010 inch (0.25mm) blue steel primary or stiffer member, it is generally desired that the angle not exceed 20°.

These and other features and advantages of the invention will be understood from the following detailed description of the preferred embodiments, taken in conjunction with the drawings and claims.

Figure 1:
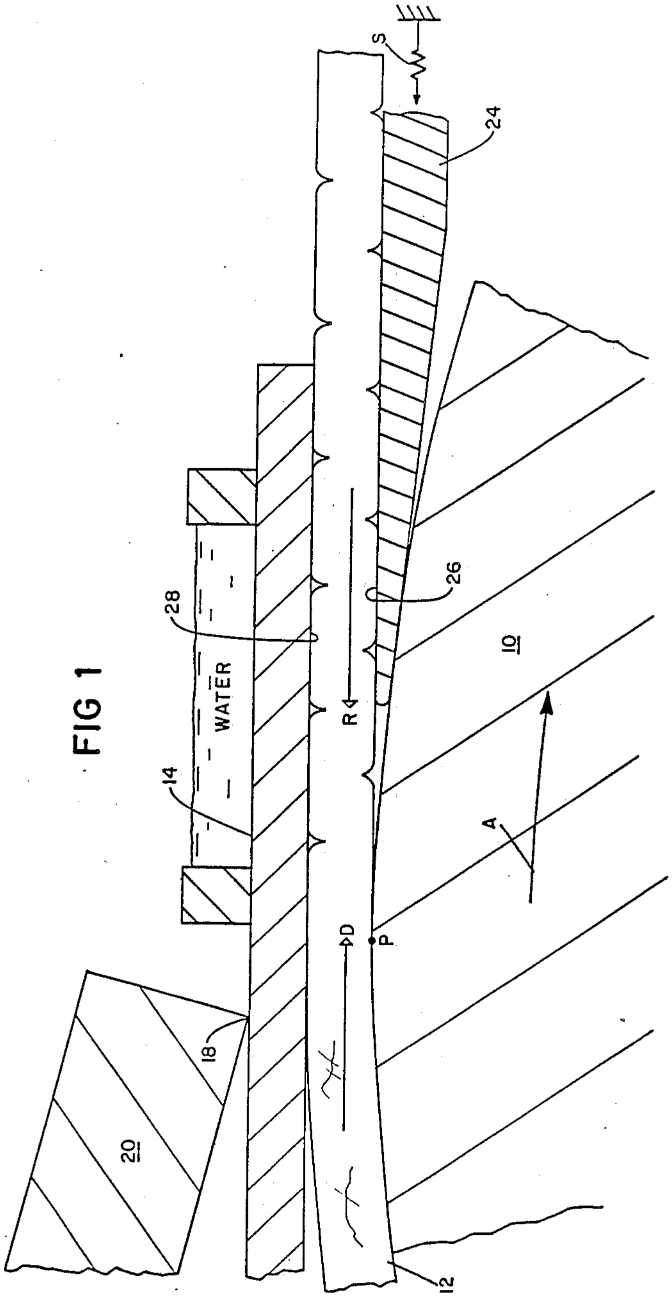
FIG. 1 is a diagrammatic, highly magnified side sectional view of the treatment cavity of a machine constructed according to the invention.
Figure 1A:
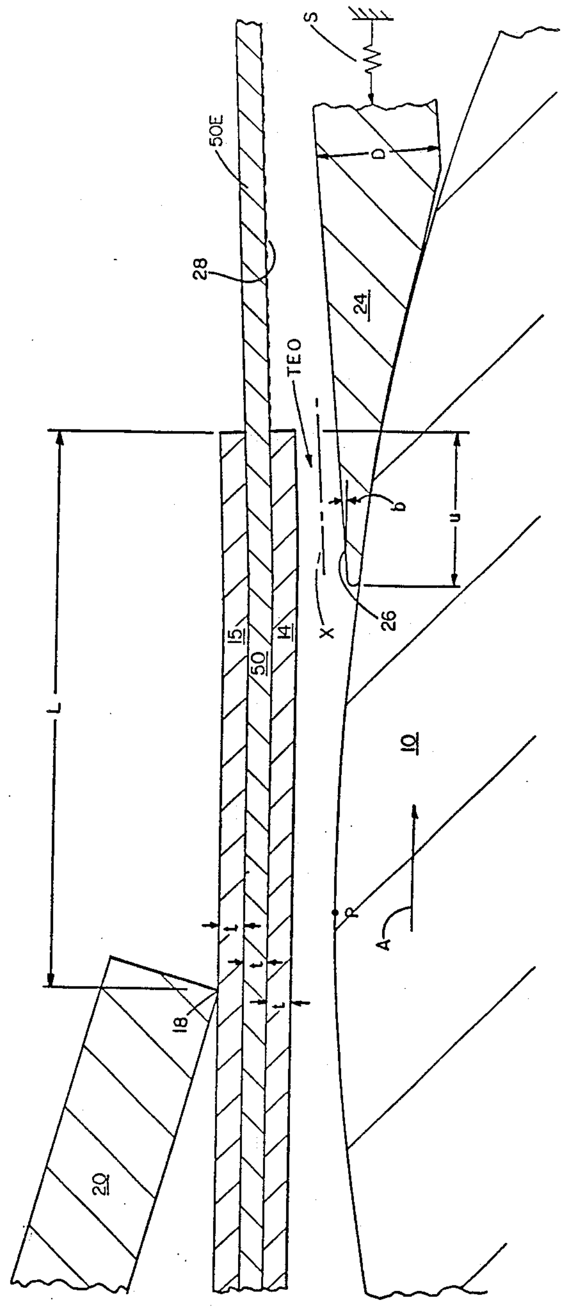

FIGS. *1a* and *1b* are views similar to FIG. 1 of other embodiments of the treatment cavity according to the invention.

Figure 2A:
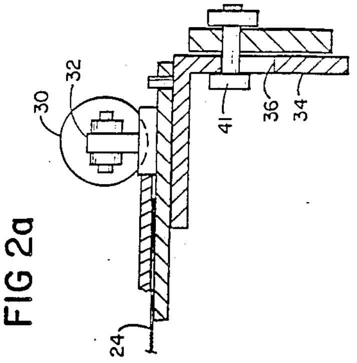
Figure 2:
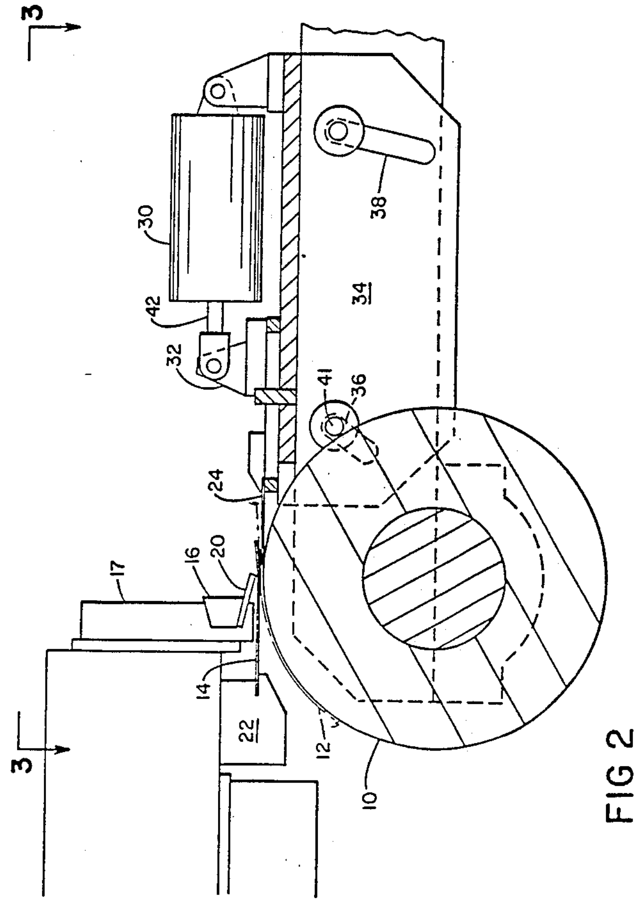

FIG. 2 is a side view of the machine of FIG. 1 partially in section.

Figure 3:
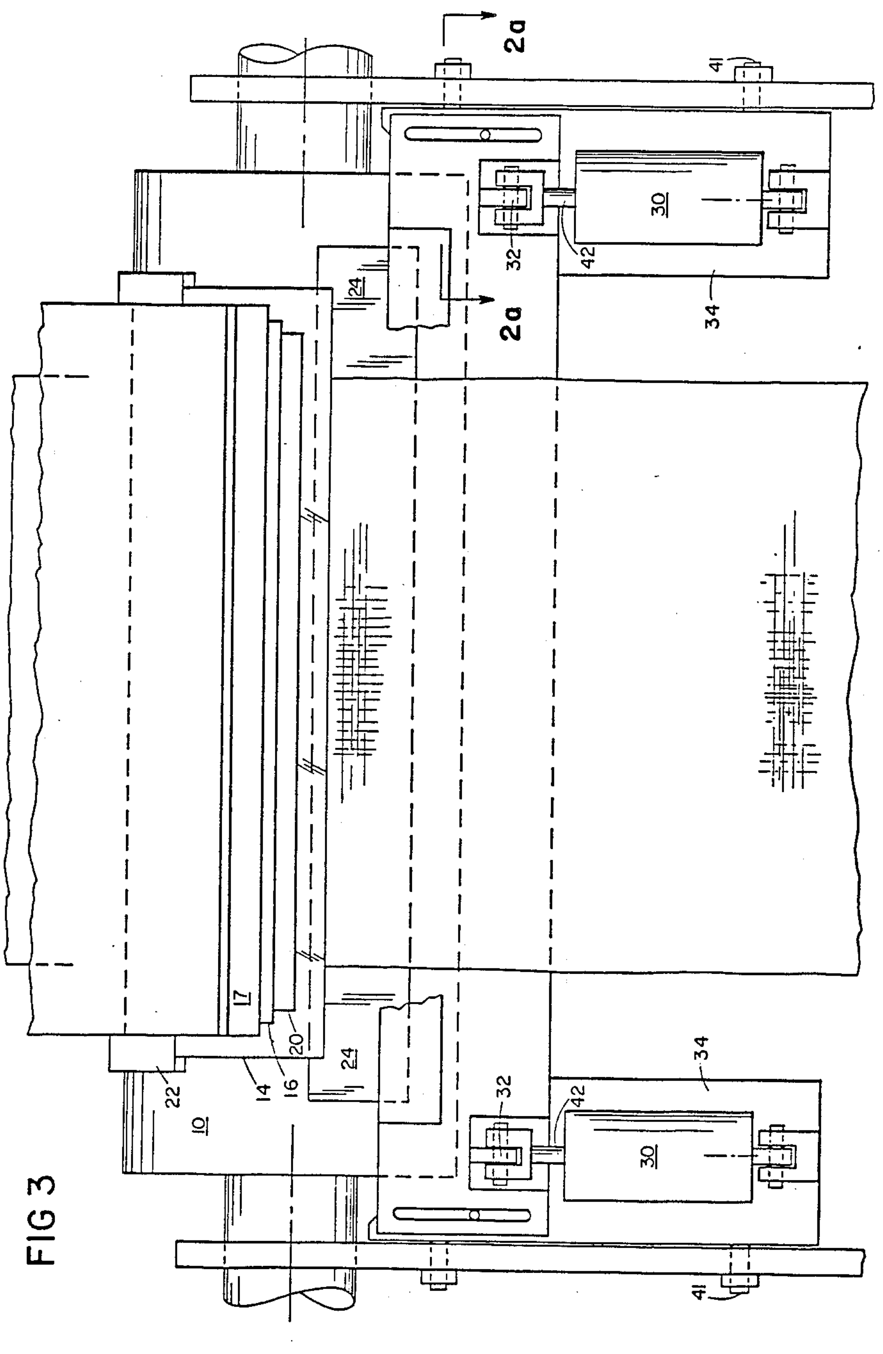

FIG. *2a* is a sectional view taken along *2a–2a* of FIG. 3.

FIG. 3 is a top plan view of the machine of FIG. 1 along 3—3 of FIG. 2.

Figure 4:
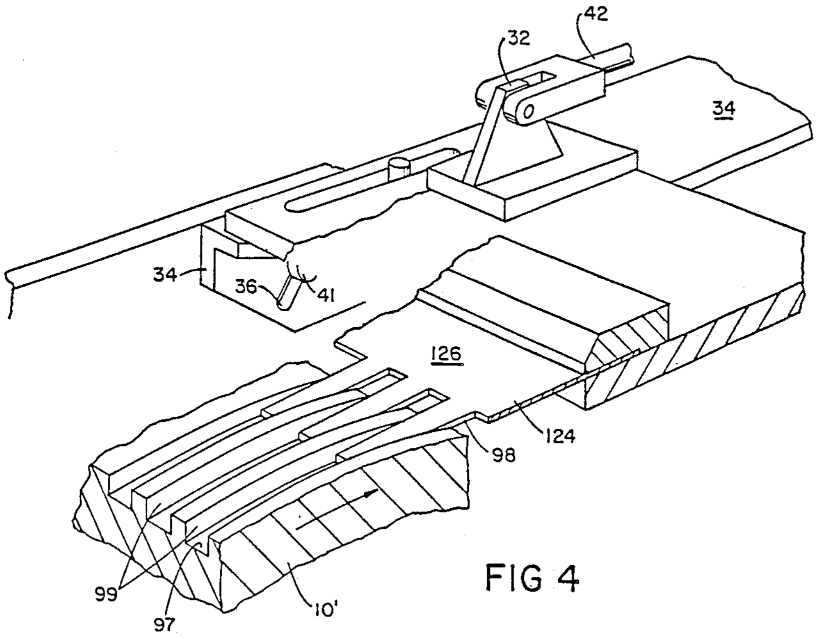

FIG. 4 is a top plan view of a second embodiment of the invention.

Figure 5:
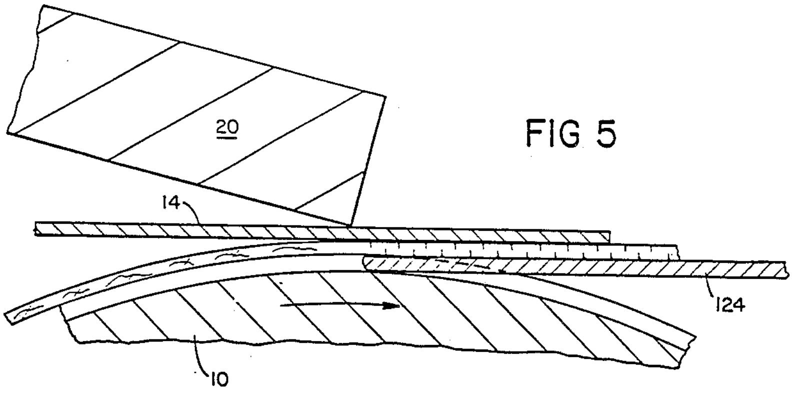

FIG. 5 is a view similar to FIG. 4, at a reduced scale.

DESCRIPTION OF THE PREFERRED EMBODIMENTS

In FIGS. 1-3, roll 10 is rotatably mounted and is driven in the direction of arrow A by a standard drive mechanism such as a chain or belt drive from a motor. Directly above roll 10 is a pressing member 20 mounted by a vertically moveable shoe 16 to cantilever outwardly from the shoe. Vertical movement of the presser mounting assembly is controlled by a pressure cylinder (not shown). Pressing member 20 is oriented in shoe 16 at an angle with respect to the horizontal, so that edge 18 of the cantilevered portion of member 20 is pressed toward the surface of roll 10.

Primary member 14 comprises a sheet of spring steel which is cantilevered forward from its attachment bracket 22. Primary member 14 extends over roll 10, and is urged toward the roll by edge 18 of pressing member 20, to form a nip region (the narrowest region between primary member 14 and roll 10). Primary member 14 extends downstream from the nip region to slightly overlie the upstream edge of blade 24 (which is resiliently urged in its plane toward the nip by air cylinders as described below). Primary member 14 has only limited capability of bending, it being thicker and relatively stiff in comparison to flexible retarders used in angled retarder machines such as those described in the background above. Preferably, the primary member is of at least 0.010 inch (0.25 mm) thickness blue steel and has a smooth surface in the nip region. In the embodiment shown, roll 10 has a diameter of 12 inches (30.5 cm).

An extrusion orifice, lying downstream from the nip region, is defined on the upper surface of the web by an extension of lower surface 28 of primary member 14 and on the lower surface of the web 12 by surface 16 of web-contacting blade member 24.

As illustrated in FIGS. 1 and 2, the pressure of presser 20 on primary member 14 and the reaction of the downstream portion of the primary member to the compacted web which fills the cavity therebeneath and exerts upward pressure, can cause the downstream portion of primary member 14 to curve slightly, and thus to diverge from the surface of roll 10. Specifically, this portion of primary member 14 may take a curve in the region immediately downstream of the nip having a radius of the order of magnitude of the radius of roll 10.

As best seen in FIGS. 2 and 3, member 24 is a planar blade-like member supported at either side respectively by vertical plates 34 which include a front adjustment slot 36 and a rear adjustment slot 38 to receive lock bolts 41 therethrough.

At either end of the downstream edge of blade 24 is a bracket 32 which is connected to the piston 42 of an air cylinder 30. By application of air pressure to these cylinders 30, blade 24 in its holder is resiliently urged to the left in FIG. 2, relative to irs support 34. This application of resilient pressure in the direction of the plane of the blade is diagrammatically represented in FIG. 1 by the arrow and spring S.

The orientation of the extrusion orifice is affected by the angle of the leading portion of the upper surface 26 of blade member 24 (measured relative to a tangent to the roll at point P, the point of final positive drive by the nip between roll 10 and primary member 14).

By moving pivot support plates 34 (see FIG. *1a*), or by chamfering the end of blade 24 (see FIG. *1b*), the angle between surface 26 and the tangent to roll 10 at point P can be varied. By restricting this angle, the axis X of the extrusion orifice can be maintained approximately parallel to the tangent to the roll, in line with the path of the web being propelled forward by the roll. Specifically, restricted angle b is generally between 0 and about 15°, 20° being the upper limit that can be employed for best results in a wide variety of instances.

The configuration of the treatment cavity which lies between the nip and the extrusion orifice can be further controlled by air cylinders 30 which urge the blade resiliently toward the nip region. Thus during start-up, before a column of compressed material has formed, the tip of the blade will move under the primary member well forward of its running position, and then as the column forms, and the pressure in the treatment cavity increases, it will react by automatically moving rearward until it reaches a stable, resiliently maintained running position that is determined by the thickness and nature of the web being treated and the amount of air pressure being applied to the air cylinders 30.

Referring to FIG. *1a*, a configuration is shown which enables extremely effective shrinking of cotton denim cloth in the dry state at temperatures in the range of 300° to 350° F. (150° to 175° C.).

In this case, although the compressive treatment continues to occur in the cavity preceding the tangential extrusion orifice TEO, this action is enhanced by a supplemental frictional effect produced by member 50. This member, of spring steel, is supported between the primary member and an above-lying member 15. It has an extended portion 50 which overlies the emerging fabric and presents a plasma coated abrasive surface of tungsten carbide of roughness in the range of 300 to 350 rms.

This member has a desirable effect on the surface of the fabric to provide a soft, "buttery" feel, and, as well, aids in ensuring smooth movement of the fabric through the machine despite the high level of compressive forces being applied.

Referring to FIG. 1*b*, a configuration is shown which enables the dry treatment of 0.001 inch 0.025 mm) paper wadding to produce an almost foamy elastic, high-stretch material while retaining strength of the material.

In this arrangement, the presser member 14 extends a distance L of 0.2 inch (5.1 mm) from the line of pressure of the presser corner 18, the angle b of surface 26 of blade 24 is set between about 12° and 15° , and the distance of penetration U of the tip of the blade under the primary member during running conditions is of the order of 0.05 inch (1.27 mm). As can be seen, the axis X of the tangential extrusion orifice TEO remains substantially parallel to the tangent to the drive roll.

Various configurations of the extension of the primary member, such as result from pinking, serrating, thinning down the extreme end as by crudely sanding the corner, not only can enhance the operation but can enable use of even thicker primary members, e.g. of 0.020 inch (5.1 mm) thickness.

Operation of the Machine

As web 12 moves with the surface of roll 10, it encounters the nip region established by the roll surface and edge 18 of presser 20 acting through primary member 14. This nip exerts a drive force, represented by arrow D, which is parallel to the tangent to the roll at point P, the final point at which the web is positively driven forward downstream from this nip, the web encounters the extrusion orifice defined by the extension of lower surface 28 of primary member 14 and the initial portion of upper surface 26 of blade member 24 (blade member 24 being resiliently urged into position by air pressure of cylinders 30). The web is thus subjected to an extrusion resistance force, represented by arrow R, which substantially directly opposes drive force D due to the orientation of the axis X of the extrusion orifice.

It will be appreciated that FIG. 1 is highly magnified so that the segment of primary member 14 shown in FIG. 1 is very short and the force of presser 20 is effective to press the cantilevered portion of member 14 downward toward the leading portion of blade 24. Since blade 24 is rigid in the direction perpendicular to its plane, it is possible to achieve the desired magnitude of force R (as regulated by the level of air pressure applied to air cylinders 30). Because of the resistance thus encountered by the web, the web extrudes at a rate considerably lower than its rate of travel at the nip region. A column of retarded material thus fills the extrusion passage and resists forward movement of material being driven forward by the roll nip. Because the web in this region is confined at its faces (by roll 10 and primary member 14) it undergoes longitudinal compressive treatment immediately following point P while the "in-line" resilience of the blade member ensures uniformity of the treatment.

There are numerous advantages to accomplishing the compressive treatment of the web with the arrangement shown.

First, because the overall direction of web travel need not deviate significantly, the amount of shear force (which can cause uneven treatment through the thickness of the web) can be very slight. The retarding is provided by a symmetrical action on the web, not by a sharp deviation in the direction of web travel.

Second, in this arrangement there is no need for a highly flexible member to confine the web, and instead it is possible for all steel sheet members contacting the web in the compressive treatment region to be of substantial thickness, to provide stability and long wear. (primary member 14 is significantly stiffer and thicker than would be the case of a flexible retarder in a conventional microcreper, which is required to bend at a relatively sharp angle.) As a result, wear on member 14 is reduced, and system failure or need for adjustment as a result of such wear or permanent bending is reduced or avoided.

Third, related to the first and second advantages, it now becomes possible to conduct the treatment with little skill in set up and little operator attention; in fact, it is possible to change between webs of very different characteristics with little or no change in the adjustment of the machine.

Fourth, because of the generally flat nature of the primary member 14 it becomes practical to provide coolant dams on its upper surface and to introduce cooling liquid, to cool member 14, as shown in FIG. 1, and thus permit high speed operation.

Fifth, because the plane of blade 24 lies substantially parallel to the drive direction, there are numerous advantages as to simplicity of construction and adjustment. Because there is a very small component of force on blade 24 in the direction perpendicular to the plane of the blade, the blade is relatively free to move in its plane in two types of movement. In one type of movement, the transverse leading edge of surface 26 of blade 24 can remain generally perpendicular to the direction of web travel as the blade moves closer or farther from the nip region, substantially in its own plane. Movement closer shortens the length of the treatment cavity, while narrowing the extrusion passage at a gradual and controllable rate. The thinner the web and the finer the crepe desired, the shorter the treatment cavity should be, and usually the higher the resilient pressure to be applied. To adjust the position of the blade member, the air pressure in both cylinders 30 is adjusted. A small amount of movement of this type can occur automatically during operation, by virtue of the resilience of the mounting of the blade member, in response to variations in the character of the fresh web or in response to change in speed of the drive roll.

A second type of movement by blade 24, again in the plane of the blade, involves slight pivoting or self-aligning of the leading edge transverse to the direction of web travel. Such movement avoids the need for critical adjustments and also may be desired to account for variations in web thickness across the width of the web. For example, if an unusual thickness in one side of the web is presented to the treatment cavity, the force on that side of blade 24, which is opposed by one of the cylinders 30, will drive that side of the blade slightly back relative to the opposite side of blade 24. Such movement can be achieved automatically as a result of the relatively light loading of cylinders 30, which permits them to respond to relatively small forces caused by variations in the web. The relatively light loading of surface 26 in the direction perpendicular to that surface is achieved as a result of its substantially tangential orientation.

To summarize some of the advantages of the present invention compared to the best prior microcreper machines, the present invention makes possible the following:

- elimination of back and forth head adjustment seeking to find the optimum amount of overhang of the sheet form members beyond the presser bar;

enabling the use of thicker, longer-wearing members, e.g., capable of sustaining high speeds of operation;

elimination of expensive grinding of the primary member to achieve precise steps in the cavity; and providing a system which has the same physical action despite variation in process conditions of the web such as temperature, moisture content and plasticity, and thus allowing tuning and optimization of these variables without concern for the machine, other than adjustment of the position of the blade in accordance with the fineness or coarseness of the treatment desired.

FIGS. 4–5 illustrate a second embodiment of the invention in which the bottom of the extrusion passage is defined by member 124 which has an upstream edge formed by fingers 98 (only 3 shown). The fingers are sized to fit within grooves 99 on roll 10' to create a smooth transition from the surface of the roll to the lower extrusion orifice-defining surface 126. Fingers 98 are narrower than grooves 99 to allow Pivoting of member 124 as described above and to avoid contact between the sides of the grooves and fingers 98. Grooves 99 are deep enough to provide clearance between the lands 97 of the grooves and fingers 98. Thus, the fingers have no wearing engagement with the drive roll, and the smooth sides of the fingers will remain smooth, thus avoiding snagging of the web.

In other respects, the operation and structure of the machine of FIGS. 4–5 is the same as that of FIGS. 1–3, and corresponding reference numerals are used in both sets of figures.

In the presently preferred embodiment, the surfaces defining the extrusion orifice are polished, useful, e.g., where speeds of operation are high or where the level of retarding forces required are low.

In other cases, one or both of the surfaces may be specially treated to provide desired effects. For instance, where an increased friction or napping effect is desired, the metal surface may be plasma coated with tiny particles of tungsten carbide to provide relative high friction, long wear surfaces.

In other embodiments, special shaping of the trailing edges or the surface of the machine elements, including provision of slots, pinked edges and the like, can be employed to produce plisse stripes and other desired aesthetic and functional effects. These are well described in our prior patents referred to in the above introduction.

What is claimed is:

1. A machine for microcreping a running length of web comprising a driven roll, a stationary primary pressing surface for pressing the web against the surface of said roll to drive the web forward at a drive nip, and first and second generally stationary downstream web-contacting surfaces on sides of the web corresponding to said roll and primary surface, respectively, adapted to define an extrusion orifice to provide an extrusion retarding effect to the oncoming web, said second generally stationary downstream web-contacting surface being an extension of said stationary primary pressing surface, the driving and retarding of said web being adapted to cause its longitudinal compressive treatment in a cavity defined in the region of transition of the web from said roll to said downstream surfaces, that improvement wherein:

the machine is adapted to treat the web in response to retarding forces produced by tangential extrusion, said first and second generally stationary downstream web-contacting surfaces defining an extrusion orifice (TEO) the axis X of which extends at an angle substantially parallel, i.e., at an angle less than 20°, to the tangent to the roll at the final point P of positive drive of the web, the extrusion resistance force R provided solely by the surfaces defining said orifice, serving to maintain a substantially straight retarded column of treated web material capable of resisting forward movement of material freshly driven by said roll, to cause said longitudinal compressive treatment of the web, said first web-contacting surface being defined by a generally plate-form blade member, said plate-form member being resiliently urged toward the driven nip by a force acting generally parallel to the tangent to the roll in the manner to enable resilient self adjusting movement of said plate member in its plane in response to operating conditions of said machine.

2. The machine of claim 1 wherein said second generally stationary downstream web-contacting surface defining said orifice is provided by a cantilevered integral continuation of said primary pressing surface.

3. The machine of claim 2 wherein said primary member comprises a sheet member of spring steel having a thickness of at least 0.010 inch.

4. The machine of claim 1 wherein the member defining said second web-contacting surface is capable of restricted flexing under treatment conditions to a curved shape in the direction opposite to that of the roll surface, to a curvature having a radius of the order of magnitude of the radius of the roll.

5. The machine of claim 1 wherein said first web-contacting surface lies in a plane which is substantially parallel to said tangent to the roll.

6. The machine of claim 1 wherein said first web-contacting surface is movable while remaining parallel to its original plane to gradually vary the geometry of said treatment cavity.

7. The machine of claim 6 wherein said movement of said first web-contacting surface is adapted to change slightly the alignment of the upstream edge thereof with respect to said roll surface.

8. The machine of claim 7 wherein said first web-contacting surface is mounted to enable it to pivot in the plane parallel to said surface to enable adjustment of the alignment of the upstream edge thereof.

9. The machine of claim 1 wherein said first web-contacting surface lies in a plane parallel to the direction of extent of said plate form member.

10. The machine of claim 1 wherein said first web-contacting surface lies at an angle to the direction of extent of said plate-form member.

11. The machine of claim 1 wherein the height of said treatment cavity gradually increases in the direction of web travel as a result of gradual, diverging curvature of both said roll and said overlying surface.

12. A method for microcreping a running length of web comprising pressing the web between the surface of a driven roll and a stationary primary pressing surface to drive the web forward at a drive nip, and providing an extrusion retarding effect to the oncoming web by employing first and second generally stationary web-contacting surfaces on sides of the web corresponding to said roll surface and primary surface, respectively, the driving and retarding of said web causing its longitudinal compressive treatment in a cavity defined in the region of transition of the web from said roll to said downstream surfaces, that improvement wherein:

the web is treated by an extrusion resistance force formed solely by tangential extrusion between web-contacting surfaces comprising first and second generally stationary surfaces that define an extrusion orifice the axis of which extends substantially parallel, i.e., at an angle less than 20°, to the tangent to the roll at the final point P of positive drive of the web to maintain a substantially straight retarded column of treated web material capable of resisting forward movement of material freshly driven by said roll, the extrusion retarding effect is resiliently maintained by providing a plate-form member to provide said first web-contacting surface, and resiliently urging said plate-form member toward the drive nip by a force acting generally parallel to the tangent to the roll in the manner to enable resilient self-adjusting movement of said plate-form member in the direction of its plane in response to operating conditions of said process.

* * * * *